Nov. 29, 1932.   H. McINTYRE   1,889,685
DOUBLE FOOT FEED
Filed Jan. 18, 1932
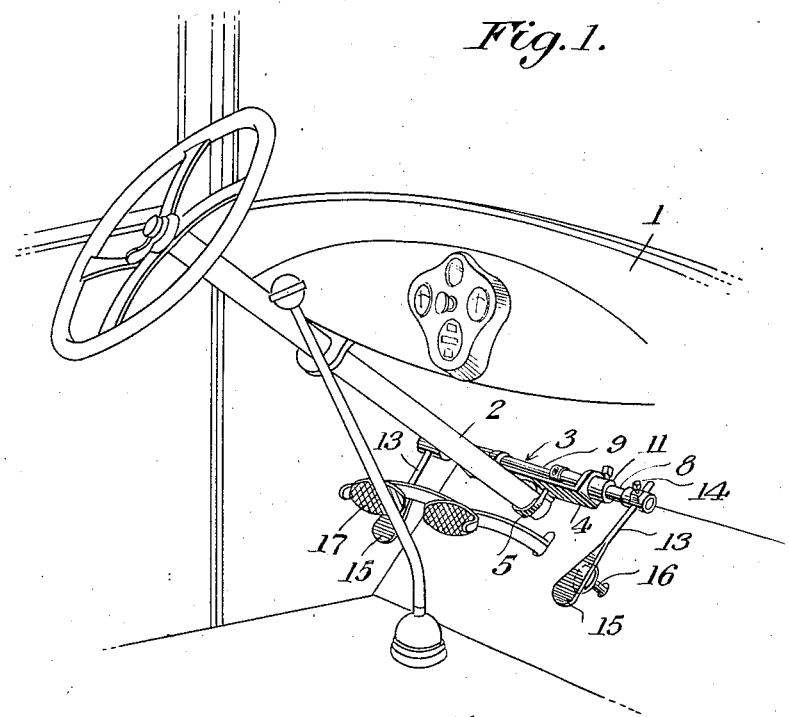
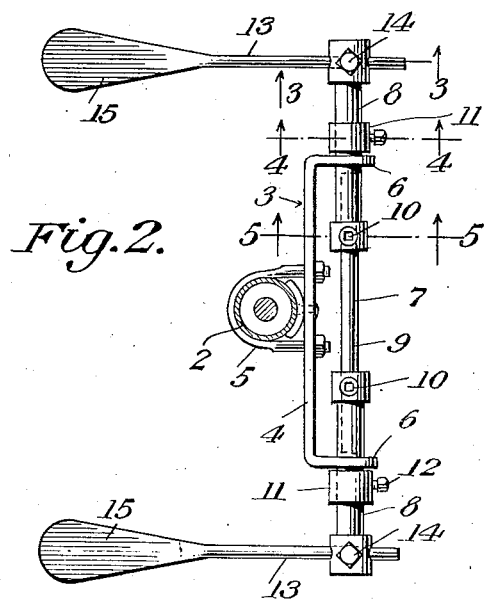
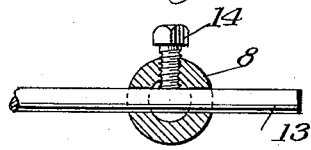
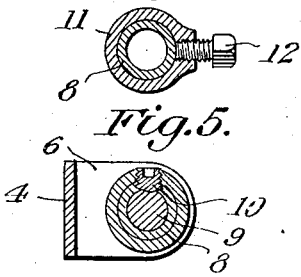
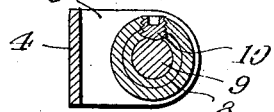
Harry McIntyre
INVENTOR
BY Victor J. Evans & Co.
ATTORNEYS Patented Nov. 29, 1932

1,889,685

UNITED STATES PATENT OFFICE

HARRY McINTYRE, OF L'ANSE, MICHIGAN

DOUBLE FOOT FEED

Application filed January 18, 1932. Serial No. 587,361.

This invention relates to attachments for motor vehicles and has for the primary object, the provision of a device which is especially adapted to provide a double foot accelerator for controlling the speed of an engine of a motor vehicle so as to permit the operator of the vehicle to employ either the right or left foot, whereby the control of the vehicle in traffic will be easier and safer than with the conventional type of single control accelerator and also rendering the starting of the engine in cold weather easier and quicker thereby conserving fuel and the electrical energy of the electric starting mechanism.

Another object of this invention is the provision of a double foot accelerator in the form of an attachment which may be easily and quickly installed on a vehicle without alteration to the latter and is capable of various adjustments so that it may be applied to vehicles of different makes.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary perspective view illustrating an attachment constructed in accordance with my invention and showing the same applied to a motor vehicle.

Figure 2 is a plan view partly in section illustrating the attachment.

Figure 3 is a sectional view taken on the line 3—3 of Figure 2.

Figure 4 is a similar view taken on the line 4—4 of Figure 2.

Figure 5 is a similar view taken on the line 5—5 of Figure 2.

Referring in detail to the drawing, the numeral 1 indicates a fragmentary portion of a motor vehicle wherein the steering post 2 has mounted thereon an attachment 3 constructed in accordance with my invention. The attachment includes a bracket 4 secured to the steering post 2 by a clamp 5 and is provided at its ends with journals 6 rotatably supporting an operating element 7. The element 7 includes tubular portions 8 adjustably connected together by a shaft 9, the latter having its ends fitting within the tubular portions and adjustably secured thereto by set bolts 10 whereby the length of the operating element may be varied so that the device can be employed on motor vehicles of different makes. The tubular portions 8 have adjusting collars 11 thereon which are adapted to be adjusted against the journals 6 to limit the endwise movement of the operating element and are held in adjusted position by a set bolt 12. The tubular portions 8 at their ends are enlarged and apertured to slidably receive arms 13 capable of adjustment relative to the tubular portions and held in adjusted positions by set screws 14. The free ends of the arms are enlarged and flattened to form foot engaging portions or treadles 15 one of which is disposed over the ordinary accelerator 16 of the motor vehicle, while the other treadle is disposed to the left of the clutch pedal 17 of the vehicle 1 thereby permitting the operator of the vehicle to actuate the accelerator 16 by either the left or right foot.

An attachment of the aforedescribed construction can be easily applied to any conventional type of motor vehicle and by permitting the operator through the attachment to operate the accelerator by either the right or left foot permits the operator to rest one foot when tired and continue the driving of the vehicle or controlling of the speed of the engine of the vehicle by the other foot. Also it is to be noted that by the use of the left foot for controlling the speed of the engine allows the operator to keep the right foot upon the brake pedal giving the operator better control over the vehicle when driving in traffic. Further it is to be noted that by permitting the operator to actuate the accelerator by the left foot has a distinct advantage when starting the engine as the right foot usually is employed for operating the starter button. With the left foot depressing the accelerator and the right foot actuating the starter button permits the operator to feed the proper amount of fuel to the engine when the starter is in operation or in the act of turning the engine of the vehicle over.

While I have shown and described the preferred embodiment of my invention, it will be understood that minor changes in construction, combination and arrangement of parts may be made without departing from the spirit and scope of my invention, as claimed.

Having thus described my invention what I claim is:

An attachment for automobiles comprising an operating element having end and intermediate sections adjustably connected to permit the length of the element to be varied, a bracket having angularly disposed apertured ends slidably and rotatably receiving the element, collars adjustably secured to the element and engaging the ends of the bracket to permit adjustment of the element endwise relative to the bracket, means detachably and adjustably securing the bracket to the steering post of an automobile, and treadles adjustably connected to the element and extending angularly thereto and one of said treadles adapted to engage and overlie the accelerator of the automobile.

In testimony whereof I affix my signature.

HARRY McINTYRE.